United States Patent
Yamada et al.

(10) Patent No.: US 7,584,065 B2
(45) Date of Patent: Sep. 1, 2009

(54) DOPPLER ULTRASONIC FLOWMETER, AND PROCESSOR AND METHOD THEREOF WITH QUANTIZATION ERROR CORRECTION

(75) Inventors: Kazuyuki Yamada, Tokyo (JP);
Yoshinori Ohmuro, Tokyo (JP);
Noritomo Hirayama, Tokyo (JP);
Masami Kishiro, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 864 days.

(21) Appl. No.: 11/066,730

(22) Filed: Feb. 25, 2005

(65) Prior Publication Data

US 2005/0209793 A1 Sep. 22, 2005

(30) Foreign Application Priority Data

Feb. 27, 2004 (JP) .................. PA 2004-054264

(51) Int. Cl.
*G01F 1/00* (2006.01)
(52) U.S. Cl. .................................... 702/54; 73/861.25
(58) Field of Classification Search ............... 702/45, 702/48, 50, 54, 66, 69, 71–72, 103, 106, 702/189–191; 73/1.16, 1.34, 1.82–1.83, 73/861.18, 861.25; 600/437, 455–456
See application file for complete search history.

(56) References Cited

U.S. PATENT DOCUMENTS 5,062,427 A * 11/1991 Seo et al. .................... 600/456
5,188,112 A * 2/1993 Sturgill et al. ............... 600/455
2004/0122317 A1* 6/2004 Heim ........................ 600/437

FOREIGN PATENT DOCUMENTS

| JP | 62-9223 A | 1/1987 |
| JP | 6-229797 A | 8/1994 |
| JP | 10-90029 A | 4/1998 |
| JP | 2000-97742 A | 4/2000 |
| JP | 2001-289681 A | 10/2001 |
| JP | 2003-130699 A | 5/2003 |

OTHER PUBLICATIONS

Written Submission of Publications issued in corresponding application No. 2004-54264, dated Nov. 26, 2007.
Office Action issued in corresponding JP application No. 2004-054264, mailed Nov. 11, 2008; partial English translation provided.

* cited by examiner

*Primary Examiner*—Eliseo Ramos Feliciano
*Assistant Examiner*—Mary C Baran
(74) *Attorney, Agent, or Firm*—Rossi, Kimms & McDowell, LLP

(57) ABSTRACT

In a Doppler ultrasonic flowmeter, to obtain a precise flow rate a flow rate calculation equation that corrects a quantization error occurring to a spatial resolution is used. An ultrasonic transducer transmits/receives ultrasonic pulses, and subject the resulting received signals to A/D conversion after a predetermined process is applied thereto. A computation control section calculates the flow velocity distribution. Then, the flow rate is calculated based on the flow rate calculation equation, which corrects the quantization error occurring to the spatial resolution.

7 Claims, 5 Drawing Sheets

| AVERAGE FLOW VELOCITY | ELECTROMAGNETIC FLOWMETER [L/min] | ULTRASONIC FLOWMETER [L/min] | |
|---|---|---|---|
| | | NOT-CORRECTED | CORRECTED |
| 5m/s | 647.17 (REFERENCE) | 723.54 (11.80%) | 649.11 (0.30%) |
| 3m/s | 385.20 (REFERENCE) | 431.96 (12.14%) | 386.51 (0.34%) |

DOPPLER ULTRASONIC FLOWMETER, AND PROCESSOR AND METHOD THEREOF WITH QUANTIZATION ERROR CORRECTION

BACKGROUND

A clamp-on ultrasonic flowmeter is a type that measures, from outside of a tubular body, such as a water pipe, the flow velocity and the flow rate of fluid flowing inside the tubular body with an ultrasonic transducer (module for transmitting/receiving ultrasonic pulses of arbitrary frequency) attached to part of the outer surface of the tubular body. The clamp-on ultrasonic flowmeter is roughly classified into a transit time type and a Doppler type.

The transit time type uses a technique in which ultrasonic waves are made to go back and forth on a path that crosses diagonally over the fluid flowing inside a tubular body. The flow rate of the fluid is measured from the difference of time taken for the ultrasonic waves to transit the outward path and the return path, respectively.

On the other hand, the Doppler type use a technique in which suspended particles, air bubbles, or other flaws included in the fluid are presumed to move at the same speed as the fluid. The flow rate of the fluid is measured by measuring the speed of the suspended particles, air bubbles, or other flaws. Because through the transmission of ultrasonic waves into the fluid, the frequency of the ultrasonic waves reflected from the suspended particles or other flaws is changed by the Doppler effect, the flow velocity of the fluid can be calculated based on the resulting frequency drift, and the flow rate of the fluid can be calculated by subjecting the flow velocity distribution to integration computation.

Such a conventional technology for the Doppler ultrasonic flowmeter is disclosed in JP-A-2000-97742, for example. Such a Doppler ultrasonic flowmeter allows a fairly accurate flow rate measurement without touching the fluid in the unsteady state. In that reference, ultrasonic pulses (a group thereof) are transmitted toward measurement fluid subject at required intervals, and ultrasonic echoes as a result of reflection on a reflector located on the measurement line are received. Based thereon, a Doppler shift (frequency shift; change of frequency) is calculated so that a flow velocity distribution is derived for the subject fluid. Based on the resulting flow velocity distribution, the flow rate is derived by integration computation.

Referring to FIG. 6, the flow velocity distribution and flow rate computation are made as follows. A group of reflection echoes indicated by (1) are reflection echoes with respect to a specific transmission pulse, and a group of reflection echoes indicated by (2) are reflection echoes with respect to another pulse that is transmitted successively to the transmission pulse. In FIG. 6, $\Delta t$ denotes a repetition period (pulse repetition period T) of the transmission pulse. The reflection echoes partially show a large amplitude at parts of A and B. The part of A indicates the reflection echoes resulting from the reflection on an entrance wall of the tube, and the part of B indicates reflection echoes resulting from the reflection on the opposite wall of the tube. The part between A and B indicates the part along the measurement line (travel path of ultrasonic waves) inside of the tube. By measuring the amount of Doppler shift of the reflection echoes at the respective positions between these parts A and B, the flow velocity of the fluid can be measured at the positions on the measurement line corresponding to the positions. In this manner, calculating the flow velocity at the respective positions can successfully lead to the flow velocity distribution as shown in the drawing, for example.

Note here that the flow velocity distribution can be derived by repeatedly executing, tens and hundreds of times, the process of calculating the flow velocity based on the received reflection echoes. Note also here that the measurement line has an angle of $\theta f$ with respect to the normal to the tube pipe axis. In fact, the positions on the measurement line are converted into the positions on the cross section of the tube using the angle of $\theta f$.

The flow velocity distribution derived as such is then subjected to an integration process so that the flow rate can be calculated. At, that time, the integration process is executed not using the flow velocity distribution in its entirety, but using the flow velocity distribution of the integration range as shown in the drawing. For example, the integration range is a range from the center of the tube (tube axis) to the opposite wall.

Moreover, the specific position on the above-described measurement line (on the cross section of the pipe) is referred to as a channel. In other words, any arbitrary area of the measurement line is divided into an arbitrary number of sections, and each section is referred to as a channel. For example, when the division number is 50, there are 50 channels (which division number relates to a spatial resolution). The above-described flow velocity is thus derived on the basis of the channel, and the points of the flow velocity distribution shown in FIG. 6 respectively represent the channel position and the flow velocity thereof.

Here, the sound velocity or the distance for the ultrasonic waves to travel in the tube wall or in the fluid is known in advance. Thus, based on the known factors, in the reflection echo waveform shown in FIG. 6, calculation can be made in advance for the correspondence between the data timing and the channel position. Specifically, the time taken for transmission and reception can be calculated in advance for each of the channel positions on the cross section of the tube, and the thus derived correspondence between the channel position and the time can be stored.

As described above, the flow velocity distribution is used as a basis to calculate the flow rate through an integration process. Therefore, the integration range has a large influence over the measurement precision for the flow rate. The quantization error, however, generally occurs to the spatial resolution, which error results in an integration error, which in turn results in a measurement error.

Accordingly, there remains a need for a Doppler ultrasonic flowmeter that can more accurately measure the flow rate by lowering the measurement error. The present invention addresses this need.

SUMMARY OF THE INVENTION

The present invention relates to a Doppler ultrasonic flowmeter, and the processor and method thereof. Specifically, the present invention calculates the flow rate using a flow rate calculation equation in which a quantization error occurring to a special resolution is corrected.

One aspect of the present invention is a Doppler ultrasonic flowmeter for measuring, using an ultrasonic Doppler shift, a flow rate of fluid flowing inside a tube or conduit. It includes ultrasonic wave transmission/reception means for transmitting to the fluid an ultrasonic pulse with an arbitrary pulse repetition frequency, and for receiving the resulting ultrasonic echo to extract a Doppler shift component through a predetermined process. It further includes flow velocity distribution calculation means for calculating the flow velocity distribution of the fluid based on the Doppler shift component extracted by the ultrasonic wave transmission/reception means. It also includes flow rate calculation means for calculating the flow rate based on the calculated flow velocity distribution of a predetermined integration range and a quantization error occurring to a spatial resolution.

The flow rate calculation means corrects the quantization error by, for a channel at a starting position and a channel at an end position of the integration range, consideration only the region of the integration range occupied by the channels. The flow rate calculation means can calculate the flow rate (Q) based on the following equation:

$$Q = 2\pi \left( v_0 \cdot r'_0 \cdot \Delta r'_0 + \sum_{i=1}^{N-1} v_1 \cdot r_i \cdot \Delta r_i + v_N \cdot r'_N \cdot \Delta r'_N \right)$$

$$= 2\pi \left[ v_0 \cdot \left( \frac{1}{2} \cdot \frac{r_0 + r_1}{2} \right) \cdot \left( \frac{r_0 + r_1}{2} \right) + \sum_{i=1}^{N-1} (r_i \cdot \Delta r_i) \cdot v_i + v_n \cdot \right.$$

$$\left. \left( \frac{1}{2} \cdot \left( \frac{D}{2} + \frac{r_{N-1} + r_N}{2} \right) \right) \cdot \left( \frac{D}{2} - \frac{r_{N-1} + r_N}{2} \right) \right]$$

where $$\left( \frac{1}{2} \cdot \frac{r_0 + r_1}{2} \right) \cdot \left( \frac{r_0 + r_1}{2} \right)$$

is a flow rate coefficient of a starting channel, $(r_i \cdot \Delta r_i) \cdot v_1$ is a flow rate conversion factor, $$\left( \frac{1}{2} \cdot \left( \frac{D}{2} + \frac{r_{N-1} + r_N}{2} \right) \right) \cdot \left( \frac{D}{2} - \frac{r_{N-1} + r_N}{2} \right)$$

is a flow rate coefficient of an end channel, and where v is the flow velocity of the respective channel, r is the distance from the center of the tube to the center of the respective channel, $\Delta r$ is the width of the respective channel.

Another aspect of the present invention a processor for the above-described Doppler ultrasonic flowmeter. The processor includes the above-described flow velocity distribution calculation means and the flow rate calculation means.

Another aspect of the present invention is a method of computing the flow rate of fluid flowing inside a tube using the above-described Doppler ultrasonic flowmeter. The method comprises calculating the flow velocity distribution and the flow rate as discussed above in the other aspects of the present invention.

Another aspect of the present invention is a storage device storing a computer program that contains codes for calculating the flow rate discussed above.

DETAILED DESCRIPTION

Figure 1:
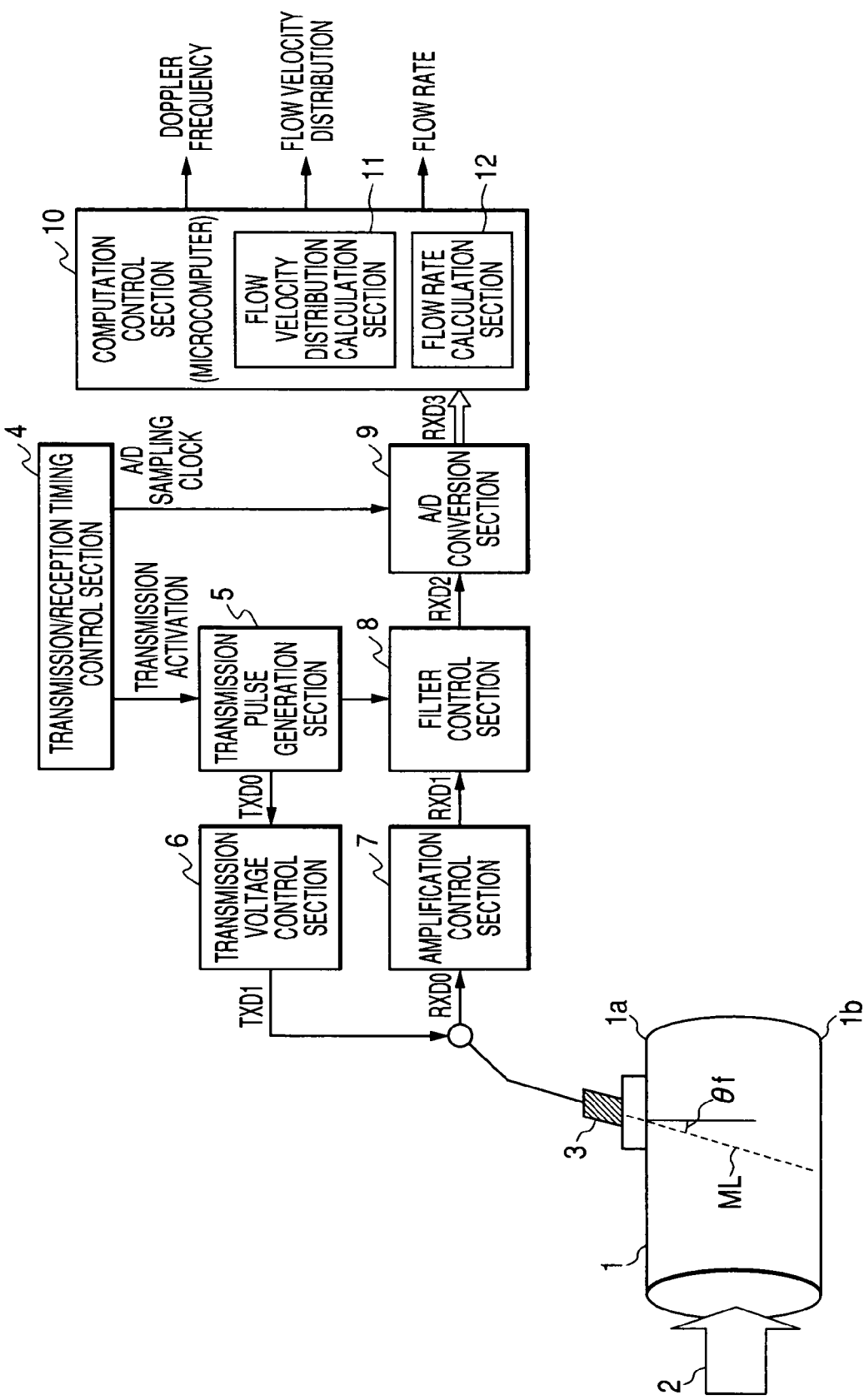
FIG. 1 schematically illustrates a Doppler ultrasonic flowmeter according to the present invention.

Referring to FIG. 1, the present Doppler ultrasonic flowmeter includes an ultrasonic transducer 3, a transmission/reception timing control section 4, a transmission pulse generation section 5, a transmission voltage control section 6, an amplification control section 7, a filter control section 8, an A/D conversion section 9, and a computation control section 10. The computation control section 10 can be a microcomputer (CPU/MPU), and includes a flow velocity distribution calculation section 11, and a flow rate calculation section 12.

Hereafter, the above-described components, i.e., the ultrasonic transducer 3, the transmission/reception timing control section 4, the transmission pulse generation section 5, the transmission voltage control section 6, the amplification control section 7, the filter control section 8, and the A/D conversion section 9, are collectively referred to as an ultrasonic wave transmission/reception section. As will be described below, the ultrasonic wave transmission/reception section forwards ultrasonic pulses to a measurement fluid subject 2 in a tube or conduit 1 with an arbitrary repetition frequency, and receives ultrasonic echoes that are reflection waves derived by a reflector or a tube inner wall. The filter control section 8 extracts the Doppler shift component for A/D conversion. Note here that the illustrated Doppler ultrasonic flowmeter is a clamp-on type ultrasonic flowmeter.

Note also here that the flow velocity distribution calculation section 11 and the flow rate calculation section 12 are implemented by the above-described microcomputer (CPU or MPU; computer) executing a predetermined program that is stored in an internal or external storage device such as memory, hard drive, etc. (not illustrated per se) associated with the microcomputer. Moreover, any data needed for such program execution also can be stored in the storage device.

The above-described ultrasonic pulse can be repeatedly transmitted with any predetermined pulse repetition intervals. This pulse repetition interval is under the control of the transmission/reception timing control section 4. That is, the transmission/reception timing control section 4 follows the pulse repetition interval of its own to instruct the transmission pulse generation section 5 to generate a transmission pulse every time a pulse transmission timing comes. The transmission pulse generation section 5 has a quartz oscillator that generates an electric signal TXD0 of a predetermined frequency of f0, and forwards the electric signal TXD0 (transmission pulse) to the transmission voltage control section 6 responding to the instruction. The transmission voltage control section 6 changes the voltage of the electric signal TXD0 to a predetermined voltage (transmission voltage), and forwards the resulting electric signal TXD1 to the ultrasonic transducer 3. In this manner, from the ultrasonic transducer 3 into the tube 1, forwarded are the ultrasonic pulses of an amplitude corresponding to the transmission voltage.

The ultrasonic transducer 3 is a transmitter/receiver for ultrasonic pulses, and the ultrasonic pulses provided from the above-described ultrasonic transducer 3 enter the fluid 2 flowing inside the tube 1 with an angle of θf with respect to the normal to the tube pipe axis in the upstream direction of the fluid 2. These ultrasonic pulses are go-straight beams with little divergence, the pulse width of which is of about 5 mm, for example, and they travel over a measurement line ML. Note here that in FIG. 1, a tube wall of the tube 1 attached with the ultrasonic transducer 3 is shown as a tube wall 1a (entrance wall), and the tube wall portion on the opposite side is shown as a tube wall 1b (opposite wall). The tube 1 has an internal diameter of D.

After receiving ultrasonic echoes as a result of the above-described ultrasonic pulses reflecting on a reflector (e.g., air bubbles, foreign substances) included in the fluid 2, the ultrasonic transducer 3 converts them into electric signals, and forwards the resulting echo waves RXD0 to the amplification control section 7. These echo waves RXD0 are low in voltage level, and by the amplification control section 7, those echo waves RXD0 are amplified with a predetermined amplification ratio. After the amplification, the resulting echo waves, i.e., amplification-controlled outputs RXD1, are forwarded to the filter control section 8. The filter control section 8 separates the amplification-controlled outputs RXD1 into transmission frequency components and Doppler shift components. Thereafter, only the Doppler shift components are extracted using a low-pass filter. Thus, extracted Doppler shift components are filter-controlled outputs RXD2, and they are forwarded to the A/D conversion section 9. The A/D conversion section 9 converts the filter-controlled outputs RXD2 to digital outputs based on the predetermined sampling clock, and passes the resulting A/D-converted outputs RXD3 (digital data) to the computation control section 10. Here, the sampling clock for the A/D conversion section 9 to use at the time of A/D conversion is the one generated and output by the transmission/reception timing control section 4, and the sampling clock is input.

Although the filter control section 8 is conventional, it described here in detail. First, with respect to the frequency of the transmission pulses, the frequency of the reflection echoes shifts in accordance with the flow velocity (speed of the reflector) of the fluid (Doppler shift). Assuming here that the transmission pulses have the frequency of 900 (kHz), and the reflection echoes have the frequency of 902 (kHz), the frequency as a result of shifting as above (in the below, referred to as Doppler frequency) will be 2 (kHz). In the filter control section 8, signal components of the Doppler frequency (Doppler shift components) are extracted. Specifically, to extract the Doppler shift components, the frequency of the transmitted ultrasonic pulses is combined with the frequency of the received reflection echoes, and then the transmission frequency components are filtered. More specifically, for such component extraction, applied is a method of deriving analysis signals by orthogonal detection. In the method, with respect to the reflection echo waves, multiplication is performed to sine components and cosine components of the transmission frequency so as to separate the reflection echo waves into transmission frequency components and Doppler shift components. Thereafter, a low-pass filter is used to extract only the Doppler shift components.

Then, signals of thus extracted Doppler shift components are converted into digital data in the A/D conversion section 9 prior to inputting into the computation processing section 10. From the Doppler shift components (cosine, sine), the computation processing section 10 calculates the change of phase angle in a predetermined period, and using the result, the flow velocity distribution is derived. From the flow velocity, the flow rate is derived by integration computation.

Note here that the transmission frequency ranges from hundreds (kHz) to a few (MHz), and the Doppler frequency ranges from a few (kHz) or less. After the computation processing section 10 receives the output from the above-described A/D conversion section 9, the flow velocity distribution calculation section 11 first computes the flow velocity of a measurement range along the above-described measurement line ML. Moreover, based on the calculated flow velocity distribution specifically of a predetermined integration range, the flow rate computation-processing section 12 performs integration to calculate the flow rate. In this example, although the flow velocity distribution calculation section 11 is the same as the conventional one, the flow rate computation-processing section 12 performs flow rate calculation using a flow rate calculation equation that compensates or corrects the quantization error occurring to a spatial resolution.

The conventional flow rate calculation equation that can be used in the flow rate computation-processing section 12 will be first described, followed by the flow rate calculation equation for computing the flow rate by the computation processing section 12 according to the present invention.

In this description, for example, the integration method applies a midpoint rule (referred also to as intermediate coordinate system), and the integration range covers from the tube center (tube axis) to the opposite wall 1b. The number of channels found in such an integration range is assumed to be N+1 including channel 0 to channel N. As such, the flow rate computation processing section 12 is assumed to calculate the flow rate Q using the following equation (1) below, for example:

$$Q = 2\pi \int_0^{D/2} v(r) \cdot r \cdot dr \quad \text{Equation (1)}$$
$$= 2\pi \sum_{i=0}^{N} v_i \cdot r_i \cdot \Delta r_i$$
$$= \sum_{i=0}^{N} (2\pi \cdot r_i \cdot \Delta r_i) \cdot v_i,$$

where $V_i$ is the flow velocity of the channel i, $r_i$ is the distance from the center of the tube to the center of the channel i, $\Delta r$ is the width of the channel i, and $(2\pi \cdot r_i \cdot \Delta r_i)$ portion of the equation is the flow rate conversion factor.

Figure 2:
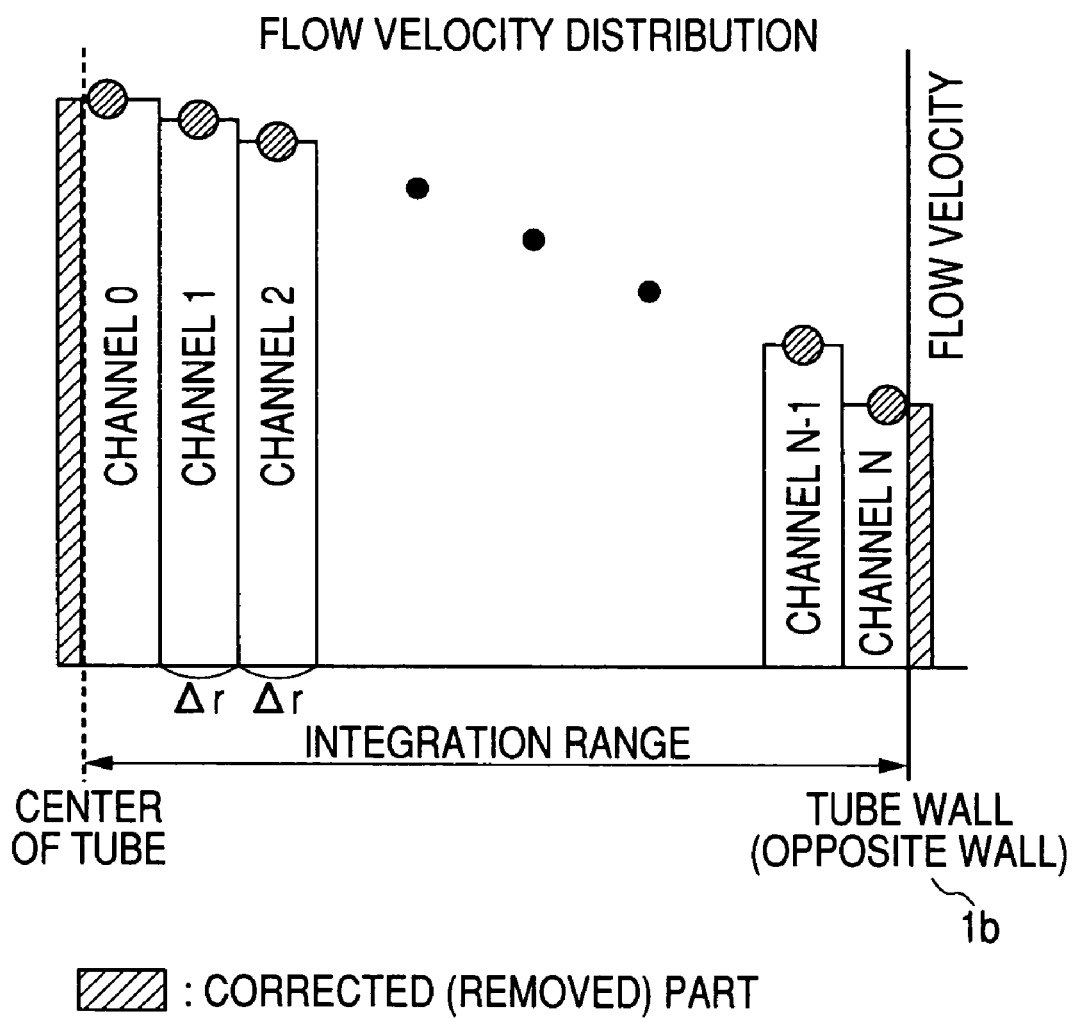
FIG. 2 schematically illustrates a quantization error occurring to a spatial resolution.

The flow rate in a specific channel is derived by calculating, for the respective channels, the area of the tube cross section occupied by the corresponding channel, and the thus calculated area is multiplied by the flow velocity of the channel. Then, the flow rate for every channel is added together. In this case, as shown in FIG. 2, as to the channels located at both ends of the integration range (channel 0 and channel N), their areas may not necessarily fit entirely in the integration range. Accordingly, using equation (1) to calculate the flow rate will resultantly include the area that is not part of the integration range. As a result, the calculation result will show a higher flow rate than the actual flow rate. Such an error is referred here to as quantization error occurring to the above-described spatial resolution (or integration error resulting therefrom).

In the present invention, as to the channels locating at the starting position and the end position of the integration range (channel 0 and channel 1), equation (1) is corrected in such a manner that no region occupied by the channel that is not being part of the integration range is considered. For such a correction, the description follows referring to FIG. 3.

First, the channel 0 will be described. In the example shown in FIG. 3, the distance from the center of the tube to the center of the channel 0 is $r_0$. In other words, in the area of the channel 0, the part not being a part of the integration range (the shaded area in the drawing) has the length of "$\Delta r/2 - r_0$."

Figure 3:
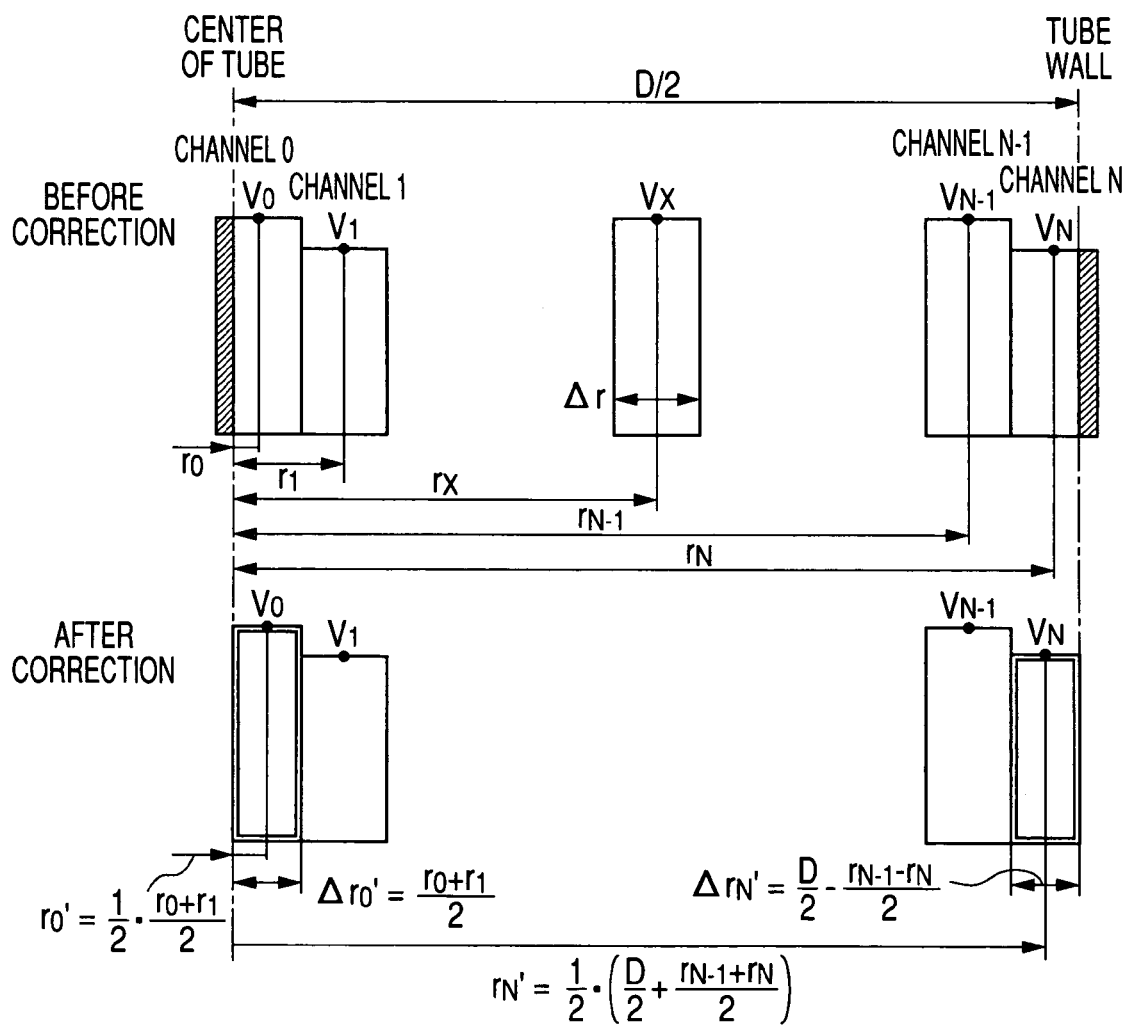
FIG. 3 schematically illustrates a technique for correcting the flow rate calculation equation.
Figures 4, 5:
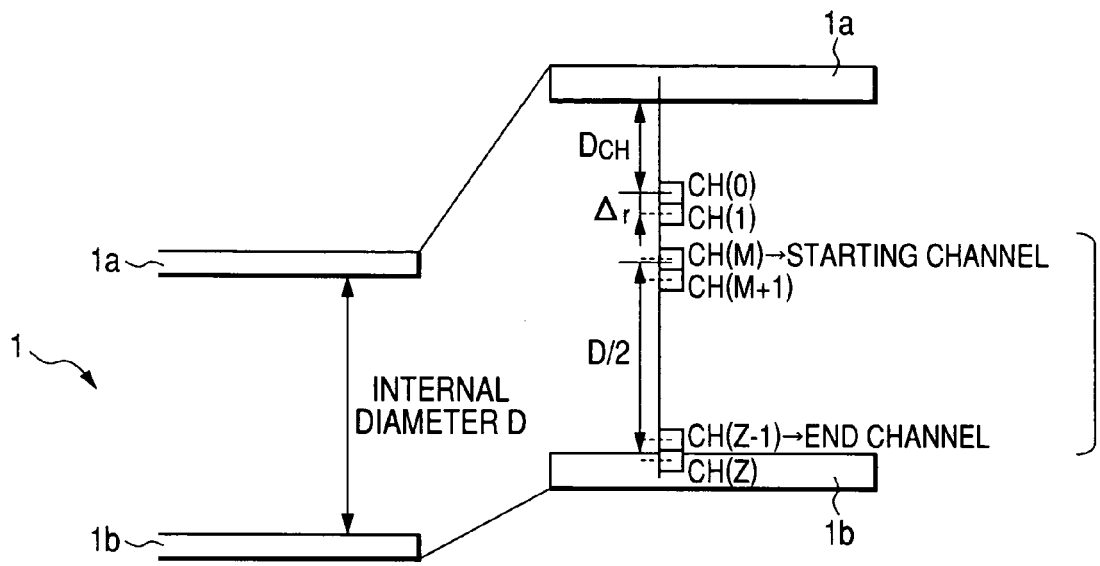
FIG. 4 schematically illustrates a channel.
FIG. 5 illustrates an exemplary experimental result of an experiment.
Figure 6:
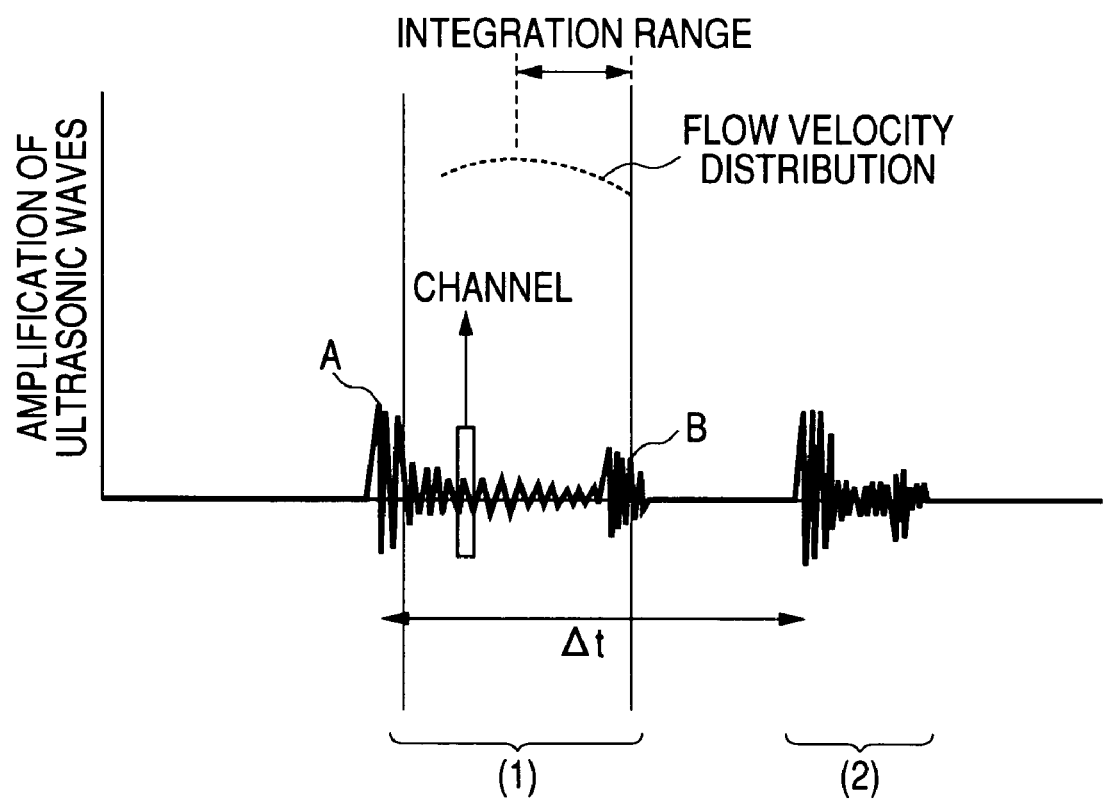
FIG. 6 schematically illustrates the conventional flow velocity distribution and flow rate computation.

Referring to FIG. 4, the information telling which channel is the channel 0, and the value of $r_0$ thereof are derived. As an input parameter, the distance $D_{CH}$ from the entrance wall $1a$ to a capture starting position is input. Here, the capture starting position is a starting position for measurement of the flow velocity distribution, and may be arbitrarily determined or selected by designers or others. As described in the background art, the flow velocity is measured also to the channel(s) not fitting the integration range. For example, the channel setting can be made so that the center thereof comes at a position having the distance $D_{CH}$ from the entrance wall $1a$, and the resulting channel is regarded as the measurement starting channel CH(0) for the flow velocity distribution. From the starting channel CH(0), channel setting is continued until reaching the opposite wall $1b$ at $\Delta r$ intervals. That is, channels CH(0) to CH(Z) are set. Thereafter, through calculation of the flow velocity on a channel basis, the flow velocity distribution can be derived. However, calculation of the flow rate is performed using the flow velocity for each of the channels locating in the integration range. In this example, however, as previously described, the integration range covers the area having the length of D/2, namely from the center of the tube to the opposite wall. Accordingly, in FIG. 4, CH(M) is the starting channel of the integration range. This is channel 0 in FIGS. 2 and 3. Note here that the reason why M is replaced with 0 is for applying equation (1).

As such, through use of the above-described distance $D^{CH}$ and $\Delta r$, the distance $CH_D(X)$ from the entrance wall $1a$ to the center of the respective channels can be derived from the following equation:

$$CH_D(X) = D_{CH} + \Delta r \times X \qquad \text{Equation (2)},$$

where X ranges from 0 to Z.

The calculation result tells that the channel whose $CH_D(X)$ satisfies the following conditional equation (3) is the starting channel of the above-described integration range (CH(M) of FIG. 4, and channel 0 of FIG. 3) (Note here that the end channel of the integration range can also be derived from the conditional equation in which D/2 in the following conditional equation is replaced with D):

$$D/2 - \Delta r/2 \leq CH_D(X) \leq D/2 + \Delta r/2 \qquad \text{Equation (3)}.$$

In the example of FIG. 4, $CH_D(M)$ satisfies this conditional equation (3), and thus the following equation (4) will lead to $r_0$ above:

$$r_0 = CH_D(M) - D/2 \qquad \text{Equation (4)}.$$

Further, $r_i$ in equation (1) can be derived from the following equation:

$$r_i = r_0 + \Delta r \times i \qquad \text{Equation (5)}.$$

Using equation (4) for $r_0$ above and the distance $r$, from the center of the tube to the center of the next channel 1 ($r_1 = r_0 + \Delta r$), through the following equations (6) and (7), we can derive the width $\Delta r_0'$ and the central point $r_0'$ in the region of the channel 0 fitting in the integral range (which does not include the shaded area in the drawing):

$$\Delta r_0' = (r_0 + r_1)/2 \qquad \text{Equation (6)}$$

$$r_0' = 0.5 \times (r_0 + r_1)/2 \qquad \text{Equation (7)}.$$

Moreover, as to the channel N, as shown in FIG. 3, the distance from the center of the tube to the center of the channel N is $r_N$, and the distance from the center of the tube to the center of the previous channel N−1 is $r_{N-1}$ (these values can be derived as described above). If this is the case, in the area of the channel N, the area fitting in the integration range (the area not including the shaded area in the drawing), the width $\Delta r_N'$ and the central point $r_N'$ thereof are to be derived as follows:

$$\Delta r_N' = \frac{D}{2} - \frac{r_{N-1} + r_N}{2}, \; r_N' = \frac{1}{2} \cdot \left(\frac{D}{2} + \frac{r_{N-1} + r_N}{2}\right). \qquad \text{Equations (8), (9)}$$

If equation (1) is corrected based on the result derived above, the resulting flow rate calculation equation (10) after correction will be as follows:

$$Q = 2\pi \left( v_0 \cdot r_0' \cdot \Delta r_0' + \sum_{i=1}^{N-1} v_i \cdot r_i \cdot \Delta r_i + v_N \cdot r_N' \cdot \Delta r_N' \right) \qquad \text{Equation (10)}$$

$$= 2\pi \left[ v_0 \cdot \left(\frac{1}{2} \cdot \frac{r_0 + r_1}{2}\right) \cdot \left(\frac{r_0 + r_1}{2}\right) + \right.$$

$$\sum_{i=1}^{N-1} (r_i \cdot \Delta r_i) \cdot v_i + v_n \cdot$$

$$\left. \left(\frac{1}{2} \cdot \left(\frac{D}{2} + \frac{r_{N-1} + r_N}{2}\right)\right) \cdot \left(\frac{D}{2} - \frac{r_{N-1} + r_N}{2}\right) \right],$$

where $$\left(\frac{1}{2} \cdot \frac{r_0 + r_1}{2}\right) \cdot \left(\frac{r_0 + r_1}{2}\right)$$

is a flow rate coefficient of a starting channel, $(r_i \cdot \Delta r_i) \cdot v_i$ is a flow rate conversion factor, and $$\left(\frac{1}{2} \cdot \left(\frac{D}{2} + \frac{r_{N-1} + r_N}{2}\right)\right) \cdot \left(\frac{D}{2} - \frac{r_{N-1} + r_N}{2}\right)$$

is a flow rate coefficient of an end channel.

That is, for the channel at a starting position and the channel at an end position, the calculation equation does not include the entire areas occupied by the starting and end position channels, but only takes into consideration only the areas falling in the integration range.

The flow rate computation-processing section 12 according to the present invention calculates the flow rate using equation (10). Accordingly, with no influence by quantization errors occurring to the spatial resolution, the flow rate measurement can be performed with a higher precision.

FIG. 5 shows an exemplary experimental result derived through an experiment, using a tube having an internal diameter D of 50 (mm). The fluid flowing inside the tube was water, and the division number (the number of channels) was 40. For the fluid flowing with the average flow velocity of 5 (m/s) and that of 3 (m/s), the flow rate computation processing section 12 measured the flow rate using the uncorrected and corrected flow rate calculation equations (1), (10), respectively. Moreover, an electromagnetic flowmeter was used as a reference meter.

When the average flow velocity was 5 (m/s), the electromagnetic flowmeter measured the flow rate as 647.17 (L/min), and the measurement calculated using the uncorrected equation resulted 723.54 (L/min). The error was 11.80%. On the other hand, the measurement calculated using the corrected equation resulted 649.11 (L/min), which had only a small error (about 0.3%). The result is almost the same as for the case with the average flow velocity of 3 (m/s).

Thus, the corrected flow rate calculation equation (10) gave a much more precise result. Note here that, in spite of the advantage of achieving a very precise flow rate measurement, the electromagnetic flowmeter has drawbacks in that it requires greater time and effort to use, and at a very high cost, as is not a clamp-on type.

Note here that although the midpoint rule is applied as the integration method, the present technique is applicable with any other integration method (trapezoidal rule, Simpson's rule, etc.).

A Doppler ultrasonic flowmeter that uses the corrected flow rate as set forth here achieves a high precision by calculating the flow rate using a flow rate calculation equation in which a quantization error occurring to a special resolution is corrected.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, Japanese Application No. 2004-054264, filed on Feb. 27, 2004, and the disclosure of the priority application, in its entirety, including the drawings, claims, and the specification thereof, is incorporated herein by reference.

What is claimed is:

1. A Doppler ultrasonic flowmeter for measuring, using an ultrasonic Doppler shift, a flow rate of fluid flowing inside a conduit, comprising:

ultrasonic wave transmission/reception means for transmitting to the fluid an ultrasonic pulse with an arbitrary pulse repetition frequency, and for receiving a resulting ultrasonic echo to extract a Doppler shift component through a predetermined process;

flow velocity distribution calculation means for calculating a flow velocity distribution of the fluid based on the Doppler shift component extracted by the ultrasonic wave transmission/reception means; and flow rate calculation means for calculating a flow rate of the fluid based on the calculated flow velocity distribution of a predetermined integration range and a quantization error occurring to a spatial resolution wherein the flow rate calculation means calculates the flow rate (Q) based on the following equation:

$$Q = 2\pi \left( v_0 \cdot r'_0 \cdot \Delta r'_0 + \sum_{i=1}^{N-1} v_1 \cdot r_i \cdot \Delta r_i + v_N \cdot r'_N \cdot \Delta r'_N \right)$$

$$= 2\pi \left[ v_0 \cdot \left( \frac{1}{2} \cdot \frac{r_0 + r_1}{2} \right) \cdot \left( \frac{r_0 + r_1}{2} \right) + \sum_{i=1}^{N-1} (r_i \cdot \Delta r_i) \cdot v_i + v_n \cdot \left( \frac{1}{2} \cdot \left( \frac{D}{2} + \frac{r_{N-1} + r_N}{2} \right) \right) \cdot \left( \frac{D}{2} - \frac{r_{N-1} + r_N}{2} \right) \right]$$

where $$\left( \frac{1}{2} \cdot \frac{r_0 + r_1}{2} \right) \cdot \left( \frac{r_0 + r_1}{2} \right)$$

is a flow rate coefficient of a starting channel,
$(r_i \cdot \Delta r_i) \cdot v_i$ is a flow rate conversion factor, $$\left( \frac{1}{2} \cdot \left( \frac{D}{2} + \frac{r_{N-1} + r_N}{2} \right) \right) \cdot \left( \frac{D}{2} - \frac{r_{N-1} + r_N}{2} \right)$$

is a flow rate coefficient of an end channel, and where v is the flow velocity of the respective channel, r is the distance from the center of the conduit to the center of the respective channel, $\Delta r$ is the width of the respective channel.

2. The Doppler ultrasonic flowmeter according to claim 1, wherein the flow rate calculation means corrects the quantization error by considering only the region of the integration range occupied by a channel at a starting position and a channel at an end position of the integration range.

3. A processor in a Doppler ultrasonic flowmeter for measuring, using an ultrasonic Doppler shift, a flow rate of fluid flowing inside a conduit, comprising:

flow velocity distribution calculation means for calculating a flow velocity distribution of the fluid based on a Doppler shift component as a result of a predetermined process applied to a reception signal of an ultrasonic echo, which is a reflection wave of an ultrasonic pulse provided into the conduit; and flow rate calculation means for calculating a flow rate based on the calculated flow velocity distribution of a predetermined integration range and a quantization error occurring to a spatial resolution wherein the flow rate calculation means calculates the flow rate (Q) based on the following equation:

$$Q = 2\pi \left( v_0 \cdot r'_0 \cdot \Delta r'_0 + \sum_{i=1}^{N-1} v_1 \cdot r_i \cdot \Delta r_i + v_N \cdot r'_N \cdot \Delta r'_N \right)$$

$$= 2\pi \left[ v_0 \cdot \left( \frac{1}{2} \cdot \frac{r_0 + r_1}{2} \right) \cdot \left( \frac{r_0 + r_1}{2} \right) + \sum_{i=1}^{N-1} (r_i \cdot \Delta r_i) \cdot v_i + v_n \cdot \left( \frac{1}{2} \cdot \left( \frac{D}{2} + \frac{r_{N-1} + r_N}{2} \right) \right) \cdot \left( \frac{D}{2} - \frac{r_{N-1} + r_N}{2} \right) \right]$$

where $$\left( \frac{1}{2} \cdot \frac{r_0 + r_1}{2} \right) \cdot \left( \frac{r_0 + r_1}{2} \right)$$

is a flow rate coefficient of a starting channel,
$(r_i \cdot \Delta r_i) \cdot v_i$ is a flow rate conversion factor, $$\left( \frac{1}{2} \cdot \left( \frac{D}{2} + \frac{r_{N-1} + r_N}{2} \right) \right) \cdot \left( \frac{D}{2} - \frac{r_{N-1} + r_N}{2} \right)$$

is a flow rate coefficient of an end channel, and
where v is the flow velocity of the respective channel, r is the distance from the center of the conduit to the center of the respective channel, $\Delta r$ is the width of the respective channel.

4. The processor according to claim 3, wherein the flow rate calculation means corrects the quantization error by considering only the region of the integration range occupied by a channel at a starting position and a channel at an end position of the integration range.

5. A method of computing a flow rate of fluid flowing inside a conduit in a Doppler ultrasonic flowmeter using an ultrasonic Doppler shift, the method comprising the steps of:

calculating, with a flow velocity distribution calculating means, a flow velocity result of a predetermined process applied to a reception signal of an ultrasonic echo, which is a reflection wave of an ultrasonic pulse provided into the conduit; and calculating, with a flow rate calculation means, a flow rate predetermined integration range and a guantization error occurring to a spatial resolution, wherein the flow rate (Q) is calculated based on the following equation:

$$Q = 2\pi \left( v_0 \cdot r'_0 \cdot \Delta r'_0 + \sum_{i=1}^{N-1} v_1 \cdot r_i \cdot \Delta r_i + v_N \cdot r'_N \cdot \Delta r'_N \right)$$

$$= 2\pi \left[ v_0 \cdot \left( \frac{1}{2} \cdot \frac{r_0 + r_1}{2} \right) \cdot \left( \frac{r_0 + r_1}{2} \right) + \sum_{i=1}^{N-1} (r_i \cdot \Delta r_i) \cdot v_i + v_n \cdot \left( \frac{1}{2} \cdot \left( \frac{D}{2} + \frac{r_{N-1} + r_N}{2} \right) \right) \cdot \left( \frac{D}{2} - \frac{r_{N-1} + r_N}{2} \right) \right]$$

where $$\left( \frac{1}{2} \cdot \frac{r_0 + r_1}{2} \right) \cdot \left( \frac{r_0 + r_1}{2} \right)$$

is a flow rate coefficient of a starting channel, $(r_i \cdot \Delta r_i) \cdot v_i$ is a flow rate conversion factor, $$\left( \frac{1}{2} \cdot \left( \frac{D}{2} + \frac{r_{N-1} + r_N}{2} \right) \right) \cdot \left( \frac{D}{2} - \frac{r_{N-1} + r_N}{2} \right)$$

is a flow rate coefficient of an end channel, and
where v is the flow velocity of the respective channel, r is the distance from the center of the conduit to the center of the respective channel, Δr is the width of the respective channel.

6. The method according to claim 5, wherein the calculation of the flow rate corrects the quantization error by considering only the region of the integration range occupied by a channel at a starting position and a channel at an end position of the integration range.

7. A storage device storing a computer program that contains codes for calculating the flow rate according to the method of claim 5.

* * * * *